Figure 3:
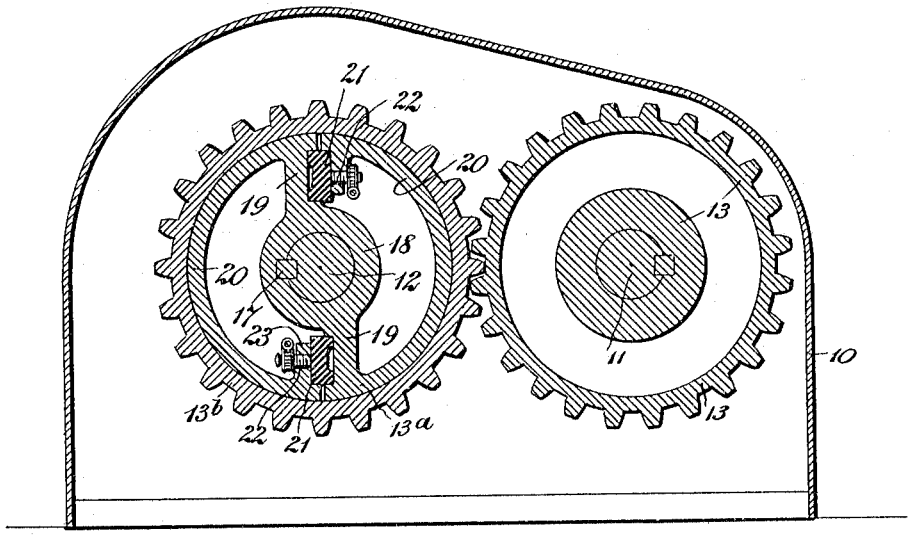

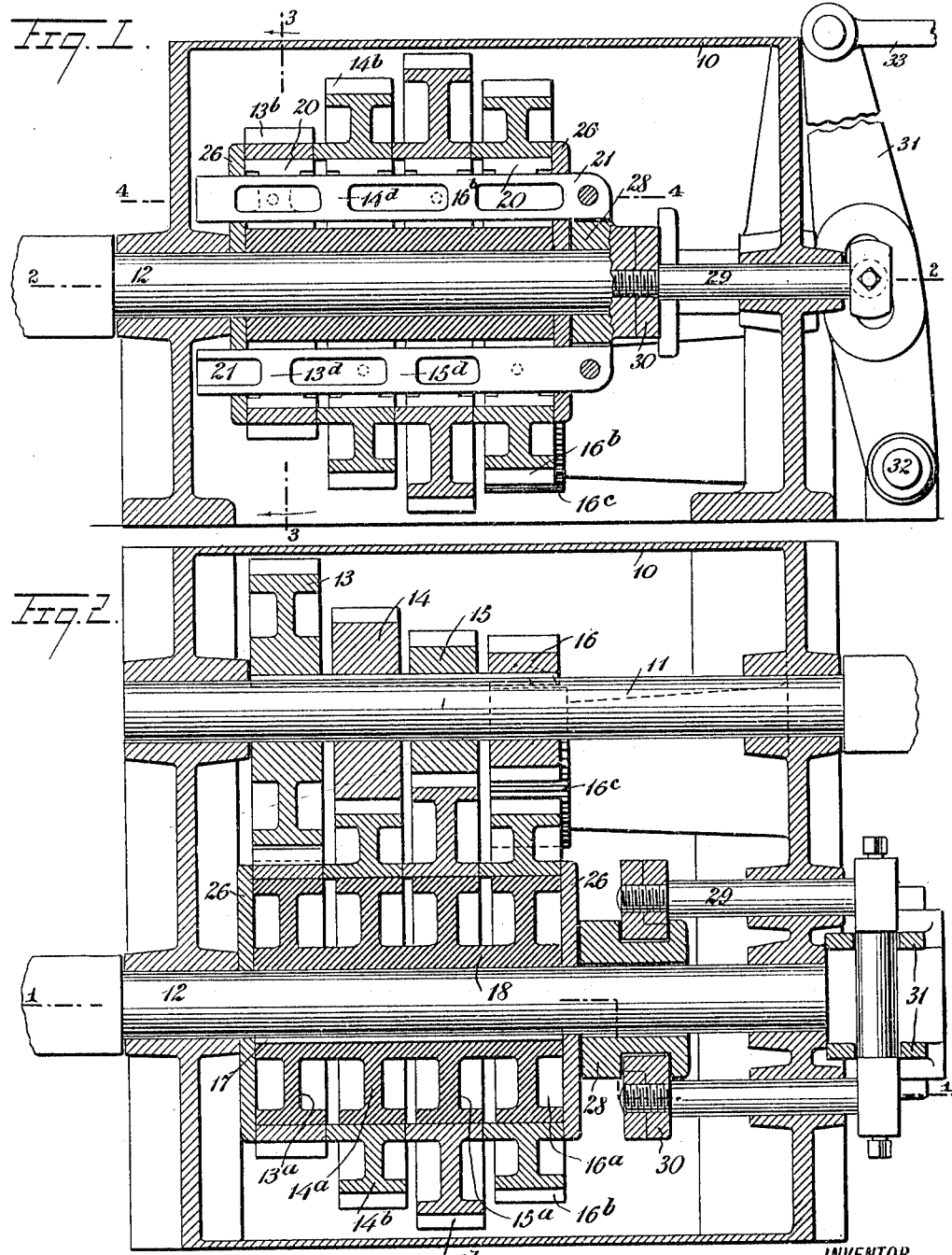

J. DOVE-SMITH.
VARIABLE SPEED GEARING.
APPLICATION FILED NOV. 19, 1913.

1,116,252.

Patented Nov. 3, 1914.
2 SHEETS—SHEET 2.

WITNESSES
H. J. Walker
Geo. L. Beeler

INVENTOR
Joseph Dove-Smith
BY
ATTORNEYS

THE NORRIS PETERS CO., PHOTO-LITHO., WASHINGTON, D. C.

UNITED STATES PATENT OFFICE.

JOSEPH DOVE-SMITH, OF NIAGARA FALLS, NEW YORK.

VARIABLE-SPEED GEARING.

1,116,252. Specification of Letters Patent. Patented Nov. 3, 1914.

Application filed November 19, 1913. Serial No. 801,852.

*To all whom it may concern:*

Be it known that I, JOSEPH DOVE-SMITH, a citizen of the British Empire, and a resident of Niagara Falls, in the county of Niagara and State of New York, have invented a new and Improved Variable-Speed Gearing, of which the following is a full, clear, and exact description.

This invention relates to change speed transmission gearing adapted for use in automobiles or other machines where variable speeds are required and where the gearing may be nested in a substantially close or compact casing for the purposes of reduction of noise, the provision of means for lubricating the gearing and other purposes.

Among the objects of this invention is to provide a slidable key device for interchangeably locking certain of the gears for driving purposes, the mechanism providing for maximum strength and rigidity of the parts.

More specifically stated, as slidable key devices have heretofore been made, the main or central shaft is made hollow for the accommodation of such key, and hence the structure is seriously weakened.

One of the objects of this invention, therefore, is to obviate this objection.

The foregoing and other objects of this invention will hereinafter be more fully described and claimed and illustrated in the drawings forming a part of this specification in which like characters of reference indicate corresponding parts in all the views, and in which—

Figure 4:
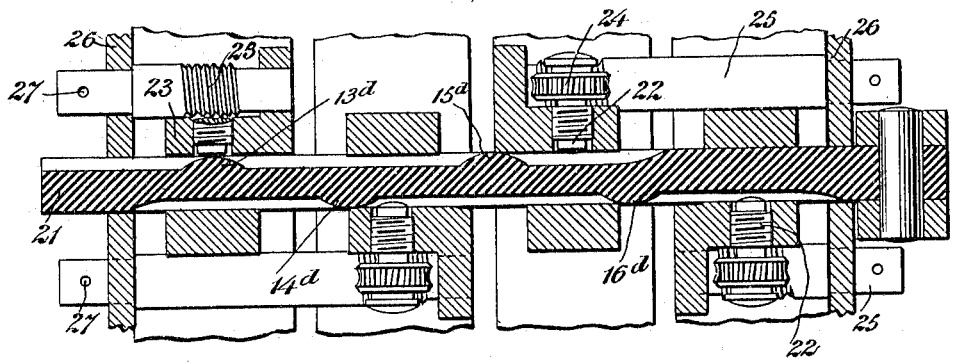

Figure 1 is a vertical sectional view on the broken line 1—1 of Fig. 2; Fig. 2 is a horizontal section on the line 2—2 of Fig. 1; Fig. 3 is a vertical transverse section on the line 3—3 of Fig. 1; and Fig. 4 is an enlarged detail on the line 4—4 of Fig. 1.

The several parts of the device may be made of any suitable materials, and the relative sizes and proportions, as well as the general design of the mechanism, may be varied to a considerable extent without departing from the spirit of the invention hereinafter more fully set forth and specifically claimed.

In carrying out this invention in a practical embodiment, I show a casing 10 within which are arranged main and countershafts 11 and 12 respectively. Either of these shafts may be regarded as the motor or power shaft, and for the purpose of description the shaft 11 will be treated hereinafter as the motor or driving shaft, the same having secured thereto a plurality of gears 13, 14, 15 and 16 representing respectively the high, intermediate, low and reverse operations and all of which are rotated continuously with said power shaft.

The driven or countershaft 12 is journaled in the casing parallel to the driving shaft and secured to it by means of a key 17 is a compound clutch member 18 having in this instance four clutch elements $13^a$, $14^a$, $15^a$ and $16^a$ corresponding to the aforesaid gears respectively. These clutch elements may partake of the form shown especially in Fig. 3 which shows that the element $13^a$, for instance, comprises a plurality of spokes 19 secured rigidly to the hub 18, each of said spokes having secured to it a portion 20 of a rim. The said several rim portions constitute a practically complete clutch rim coöperating directly with the interior surface of a gear rim $13^b$ having constant engagement with the gear 13. It will be understood that the remaining clutch elements $14^a$ to $16^a$ have corresponding gear rims $14^b$, $15^b$ and $16^b$ meshing constantly with the corresponding driving shaft gears. The reverse driving mechanism, however, will be understood to have included in it an idler pinion $16^c$ to change the direction of movement of the driven shaft as has heretofore been done.

The driven shaft to which the compound clutch member 18 is connected is or may be substantially solid and hence not weakened by providing any shiftable key or other mechanism within it.

In order to make operative any selective pair of gears for the purpose of operating the driven shaft from the driving shaft at any desired speed, I provide one or more shiftable keys 21 each operating between the stationary or rigid parts of the several clutch elements and the expansible portions of such elements. I prefer, however, to use as many of such keys 21 as there are spokes 19, as shown in Fig. 3. Each key is provided with a series of projections indicated at $13^d$ to $16^d$ having reference to the respective expansible clutch elements. Said projections, as shown in Fig. 4, are so arranged on the several keys that no two of them may be operative at the same time and whereby a slight endwise movement of the keys will be sufficient to render any desired one of the clutch elements operative. Each projection is made to coöperate in turn with an adjustable stud 22 carried by the adjacent free end of the expansible clutch rim. The stud is shown as comprising a screw tapped through a radial projection 23 of said expansible rim member. Each of said screws is shown provided with a worm wheel 24 meshing with a worm 25 journaled on an axis substantially parallel to the keys and having its principal bearing in a disk 26, at the end of the compound clutch member. Each of the key projections constitutes a wedge serving to expand the adjacent clutch element so as to make driving connection between such element and the surrounding gear rim. The actual extent of movement, however, due to the wedging action is slight and hence the bearings for the worms 25 may be loose enough to provide for such expansion and yet not interfere with the proper meshing engagement between the worms and the worm wheels. Each of the worms projects at its end beyond the supporting disk 26 whereby a suitable tool may be applied at 27 to make adjustment of the stud 22 to take up for such wear as may take place. The keys are connected to a single head 28 shiftable longitudinally of the countershaft 12 by means of a yoke 29 having loose engagement through a collar 30 whereby the head 28 is adapted to rotate freely with the shaft independently of the yoke. In other words, the driving shaft, the compound clutch member, the disks 26 and head 28 always rotate simultaneously and at a speed determined by the pair of gears in action at any particular time. The shifting of the yoke 29 and collar 30 is effected by any suitable mechanism under the control of the driver of the machine and indicated on the drawings as a lever 31 pivoted at 32 at one end and operated by a connecting rod 33 at the other end. The yoke elements, as indicated in Fig. 2, are arranged on opposite sides of the driven shaft 12 and adjacent bearing therefor.

From the foregoing description of the mechanism it is thought that the operation of the improvement will be understood without further explanation.

Having thus described my invention, I claim as new and desire to secure by Letters Patent:—

1. In variable speed transmission gearing, the combination of a casing, a pair of parallel shafts journaled in said casing, a plurality of gears of different sizes keyed to one of said shafts, a compound clutch member keyed to the other shaft and including a plurality of split ring clutch elements arranged opposite the gears aforesaid, a gear ring surrounding each of said split ring clutch elements and meshing with the gear opposite the same, each of said clutch elements including a plurality of spokes and each spoke having connected to its outer end a ring segment having a free end adjacent the next spoke, a plurality of keys slidable between said spokes and the adjacent free ends, and means extending outside of the casing for manipulating said keys.

2. In variable speed transmission gearing, the combination with a driving shaft and a plurality of gears secured thereto, of a driven shaft parallel to the driving shaft, a plurality of clutch elements secured to the driven shaft opposite said gears, a plurality of gear rings surrounding the respective clutch elements and meshing with said gears, and means for effecting driving connection between any one of said clutch elements and the surrounding gear ring leaving the remainder of the clutch elements and said rings free for independent rotation, said clutch operating means including a head surrounding and slidable along said driven shaft, a plurality of keys outside of and parallel to the driven shaft, and a yoke to control the longitudinal movement of said head and keys.

3. In variable speed transmission gearing, the combination with a pair of parallel shafts, a plurality of gears connected to one of said shafts, a plurality of clutch elements secured to the other shaft, and a plurality of gear rings surrounding said elements and meshing with the respective gears, of means for clutching any one of said clutch elements to its gear ring independently of all the others, said clutch operating means including one or more slidable keys having a series of projections adapted to coact with the several clutch elements in succession, and adjustable bearing members carried by the clutch elements coöperating with said projections.

In testimony whereof I have signed my name to this specification in the presence of two subscribing witnesses.

JOSEPH DOVE-SMITH.

Witnesses:
 E. R. DEWART,
 ALAN V. PARKER.